United States Patent [19]
Nelson

[11] Patent Number: 5,552,170
[45] Date of Patent: Sep. 3, 1996

[54] FOOD-CONTAINING SUSTAINED SHRINK FORCE COOK-IN FILM

[75] Inventor: Martindale Nelson, Greer, S.C.

[73] Assignee: W. R. Grace & Co.-Conn., Duncan, S.C.

[21] Appl. No.: 189,475

[22] Filed: Jan. 31, 1994

[51] Int. Cl.$^6$ .......................... B65B 53/00; B65D 85/00
[52] U.S. Cl. .......................... 426/113; 206/497; 426/127; 426/129; 426/412; 428/34.9
[58] Field of Search ..................... 426/127, 129, 426/412, 113, 234, 392; 206/497; 53/441, 557; 383/908; 428/35.1, 34.9

[56] References Cited

U.S. PATENT DOCUMENTS

| | | | |
|---|---|---|---|
| 4,448,792 | 5/1984 | Schirmer | 426/113 |
| 4,469,742 | 9/1984 | Oberle et al. | 428/215 |
| 4,606,922 | 8/1986 | Schirmer | 426/412 |
| 4,762,748 | 8/1988 | Oberle | 428/349 |
| 4,820,536 | 4/1989 | Lippincott et al. | 426/129 |
| 4,855,183 | 8/1989 | Oberle | 428/345 |
| 4,879,124 | 11/1989 | Oberle | 426/113 |
| 5,279,872 | 1/1994 | Ralph | 426/127 |
| 5,298,326 | 3/1994 | Norpoth et al. | 426/127 |
| 5,328,705 | 7/1994 | Wilhoit et al. | 426/127 |

*Primary Examiner*—Anthony J. Weier
*Attorney, Agent, or Firm*—Mark B. Quatt

[57] ABSTRACT

Distortion of a heat shrinkable cook-in package in a hot air cooking medium is substantially reduced or eliminated by the use of a high sustained shrink force cook-in film as the casing for the package.

2 Claims, 2 Drawing Sheets

FOOD-CONTAINING SUSTAINED SHRINK FORCE COOK-IN FILM

FIELD OF THE INVENTION

The present invention relates to packaging materials and methods, and more particularly to materials and methods used in cook-in processes.

BACKGROUND OF THE INVENTION

The term "cook-in" as used herein is intended to refer to packaging material structurally capable of withstanding exposure to time-temperature conditions while containing a food product.

Cook-in packaged foods are essentially foods cooked in the package in which they are distributed to the consumer or other purchaser, and which may be consumed with or without warming. (In some cases, the food product is removed from the original package after cooking, and repackaged in another packaging material for distribution.) Cook-in time-temperature conditions typically refer to a long slow cook, for example, heating the product to an internal temperature of between about 55° C. and 75° C. for between about 1 and 4 hours. These conditions are representative of institutional cooking requirements. Under such conditions, a cook-in packaging material should maintain its integrity, i.e., the product should maintain its interply adhesion, and any heat sealed seams should resist being pulled apart during cook-in. Additonally, it is desirable that the packaging film be substantially comformable to the contained food product. Preferably, this substantial conformability is achieved by the film being heat shrinkable under these conditions so as to form a tightly fitting package, i.e., the film should be heat shrinkable under these time-temperature conditions and should possess sufficient shrink energy so that the packaging film will shrink snugly around the contained product, and especially up to about 55% monoaxial and/or biaxial shrinkage.

The film may be used in the form of seamed or seamless casings or bags. The film is typically of polymeric, thermoplastic construction, either mono layer or multilayer. Commercial examples include CN 510 and CN 610 cook-in casings available from the Cryovac Division of W. R. Grace & Co.-Conn. Cook-in packaging materials are described in U.S. Pat. No. 4,469,742 (Oberle et al); U.S. Pat. No. 4,448,792 (Schirmer); U.S. Pat. No. 4,606,922 (Schirmer); U.S. Pat. No. 4,762,748 (Oberle); and U.S. Pat. No. 4,855,183 (Oberle).

As described in these patents, conventional shrinkable cook-in packages are used to prepare meat products such as bologna, sausage, and mortadella in casings or bags. The package is sometimes placed horizontally or in external molds to control the final shape of the package.

Vertically hung casings are submerged in hot water to prevent the product from distorting unacceptably under its own weight. The hot water cooks the meat product, and in addition provides hydrostatic support for the filled casing during the cooking cycle. This latter feature is important, because the cook-in package can sometimes be over 40 centimeters long and weigh over 3 kilograms. Thus, the hydrostatic forces exerted by the product on the casing can be quite large.

Casings that are shrinkable offer many advantages. One is a reduction in wrinkles formed at the clipped or sealed longitudinal ends of the package. These wrinkles result in product yield loss, which is an economic loss to the producer and packager of products such as smoked and processed meats.

Additionally, shrinkage results in a tighter package with a better appearance following cooking, especially when the casing is not fully filled prior to cooking.

Finally, shrinkable materials also tend to have better optics and oxygen barrier properties as the result of the orientation process used to supply the casing or film with shrink properties.

It would be desirable to use hot air instead of hot water as the cooking medium in these kinds of applications. This is because of the high equipment costs associated with hot water, in-mold and horizontal cook-in systems. Hot air cooking would also be especially desirable in low volume, specialty product applications.

However, if hot air were used instead of hot water in the vertical cook-in process, the advantages of shrink casings can not currently be obtained when cook-in packages are vertically hung, because current materials will distort excessively under the load of the product during the cooking cycle. This distortion typically increases with increasing package weight. "Gourd" shaped packages would be produced, which would be undesirable and potentially unfit for commercial distribution.

The inventor has found that the hydrostatic and pneumatic forces inside the package must be offset to provide good package shape after the cook-in cycle. The benefit of hydrostatic support provided by the hot water would be lost if hot air were used instead. Conventional shrinkable cook-in films have inadequate (too low) shrink force to offset this loss of support. However, increasing the shrink force of the film to an excessively high level can also affect package shape in a different way. If shrink forces are too high, undesirable rounding of the final package can occur.

By making a cook-in material that has a sustained shrink force within a defined range, the advantages of a shrinkable material can be obtained, while avoiding the package distortion that would occur if conventional shrinkable cook-in materials were used in vertically hung packages, and then heated in hot air instead of hot water.

It is an object of the invention to provide a shrinkable cook-in film which exhibits a sustained shrink force within a defined range, in order to provide a cook-in package with acceptable shape when hot air is used as the cooking medium in a vertically hung cooking system.

SUMMARY OF THE INVENTION

The invention is a package comprising a food article, and a heat shrinkable cook-in casing which encloses the food article, the casing comprising at least one layer of a thermoplastic polymer, the casing having a lay flat width of 165 millimeters or less, and having a sustained shrink force, in grams per centimeter, measured (ASTM D2838) after 15 minutes at a temperature to be used in a cooking cycle for the package, which exceeds the shrink force value obtained by the formula:

$$\frac{\text{package length (cm)} \times \text{casing lay flat width (cm)}}{3}$$

In another aspect, the invention is a package comprising a food article, and a heat shrinkable cook-in casing which encloses the food article, the casing comprising at least one layer of a thermoplastic polymer, the casing having a lay flat width of more than 165 millimeters, and having a sustained shrink force, in grams per centimeter, measured (ASTM D2838) after 15 minutes at a temperature to be used in a cooking cycle for the package, which exceeds the shrink force value obtained by the formula:

$$\frac{\text{package length (cm)} \times \text{casing lay flat width (cm)}}{3}$$

and also exceeds the shrink force obtained by the formula:

(5×cooking temperature (°C.))−125.

An inventive process for cooking a food product comprises providing a package comprising a heat shrinkable cook-in film containing the food product, the package having a generally cylindrical appearance; vertically hanging the package; exposing the hung package to a hot air cooking cycle without the use of a mold; heat shrinking the film of the package during the cooking cycle; and cooling the shrunk package to produce a package with a generally cylindrical appearance.

DEFINITIONS

"Sustained shrink force" is used herein to mean the force, in grams per centimeter of casing, exerted on a contained food product by the casing, after the casing, packed with the food product, has been vertically hung and exposed to a hot air cooking medium. ASTM 2682 describes a standardized test for measuring shrink force. As described and claimed herein, the shrink force of the casing, to be used as the package material, is measured in the testing process after 15 minutes, and at a temperature which matches the cooking temperature to which the casing is subjected when a package is made from the casing, and exposed to a cooking medium at a given temperature.

"Lay flat width" is used herein to mean the transverse width of the cook-in casing after it has been extruded or backseamed to create a tubular material, and then collapsed or flattened.

DESCRIPTION OF THE PREFERRED EMBODIMENTS

Figure 1:
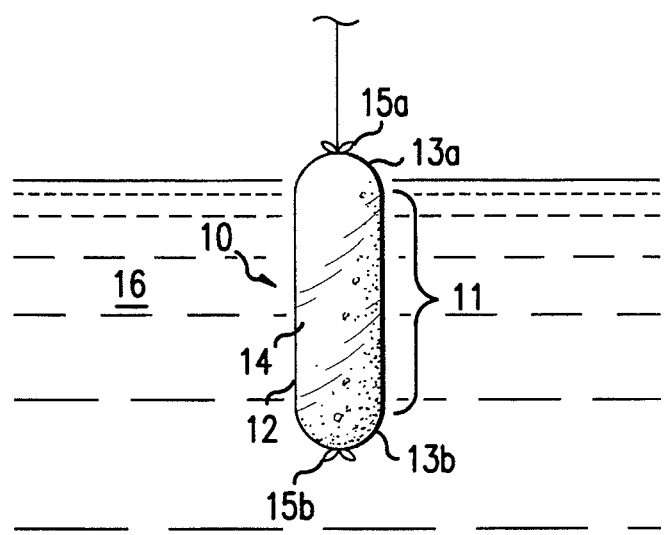
FIG. 1 is a schematic view of a conventional heat shrinkable cook-in package including a casing having been loaded with a meat product, and hung vertically into a hot water bath.

Referring to FIG. 1, a conventional cook-in package 10 is made up of a heat shrinkable film 12 in the form of a casing, and a meat product 14 contained in the casing. The conventional package is generally cylindrical in shape, and has a central, substantially cylindrical portion 11, and two converging end portions 13a and 13b. Clips 15a and 15b hold the top and bottom of the package closed at the extremities of respective end portions 13a and 13b. The package 10 is immersed in a hot water bath 16 during a cooking cycle. Because the hydrostatic pressure of the bath on the package equilibrates with the hydrostatic pressure exerted vertically downward and outward by the vertically hanging package 10, no substantial distortion of the package 10 occurs.

Figure 2:
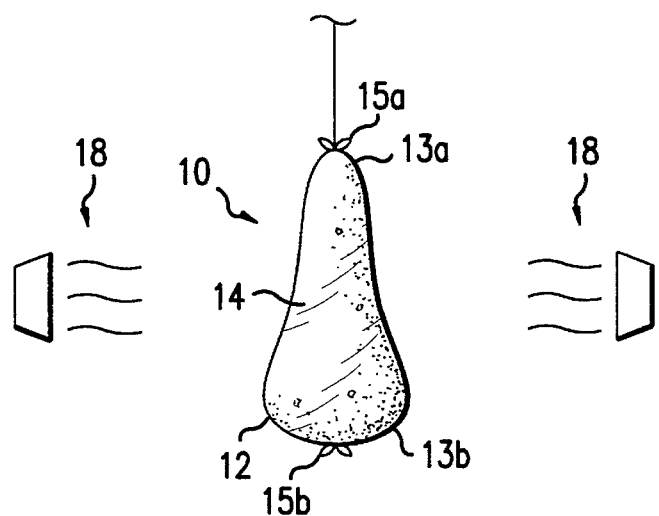
FIG. 2 is a schematic view of a conventional heat shrinkable cook-in package, including a casing, having been loaded with a meat product, and hung vertically in a heated air environment, and in which the casing has inadequate sustained shrink force.

FIG. 2 shows what happens when the same conventional package is heated in hot air 18 instead of hot water. Unsupported by a hot water bath or other supporting medium, the package 10 is distorted into a gourd shape.

Figure 3:
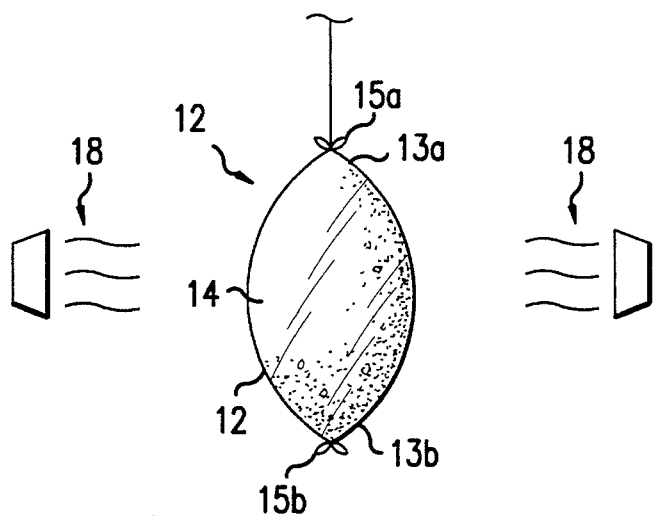
FIG. 3 is like FIG. 2, but in which the casing material has an excessively high shrink force.

In FIG. 3, a package 10 made of a casing 12 having excessively high sustained shrink force would result in a generally spherical package.

Figure 4:
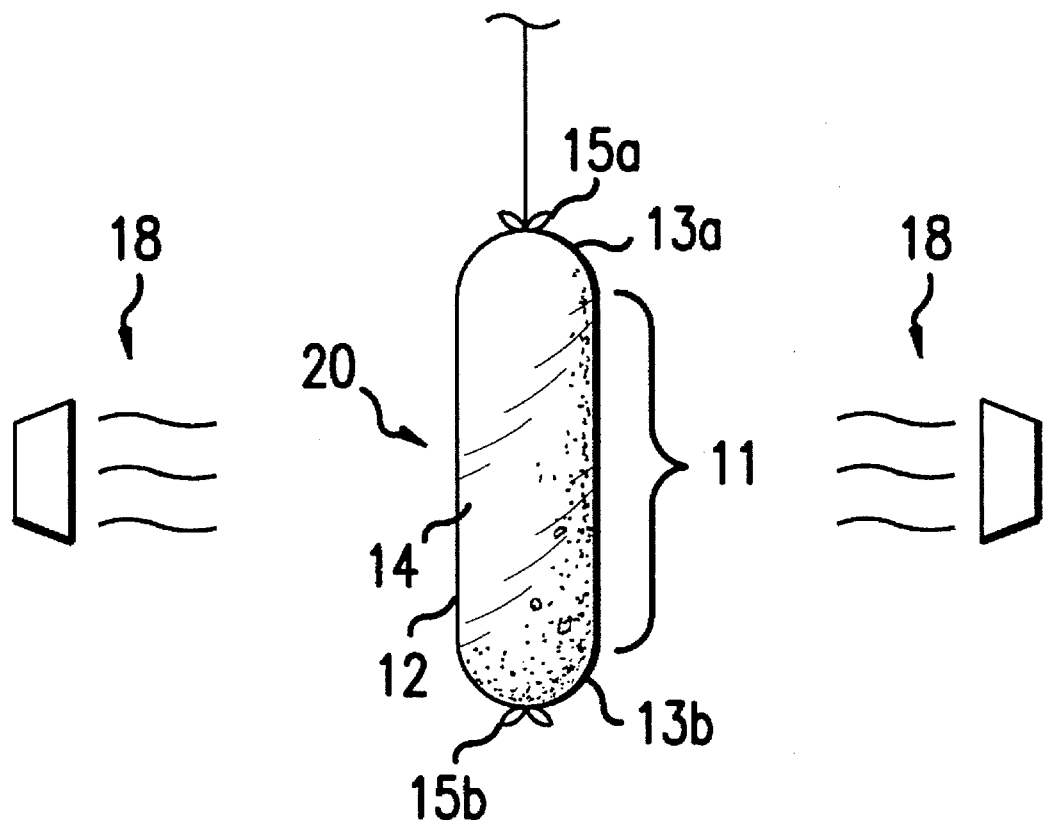
FIG. 4 is a schematic view of a heat shrinkable cook-in package, including a casing and a loaded meat product, in accordance with the present invention.

In FIG. 4, a package 20 according to the present invention includes a cook-in casing 22 with a defined sustained shrink force. The package does not appreciably distort even when the package is exposed to hot air rather than a hot water cooking cycle.

A typical cook-in package, contained a smoked or processed meat such a mortadella, can weigh ½ to 3 kilograms and be up to 46 centimeters long. Conventional casing materials include CN 610 and CN 510, both films supplied by W. R. Grace and Co.-Conn. through its packaging division.

The former material is described in U.S. Pat. No. 4,855,183, incorporated herein by reference. These materials and others, can be modified by using lower orientation temperatures during the production of the film to produce a cook-in film with a defined sustained shrink force.

Materials such as a laminate of BDF-2001 film, sold by W. R. Grace & Co.-Conn., can also be modified to impart a high but defined shrink force useful in cook-in applications. This laminate is described in U.S. Pat. No. 5,374,459, assigned to the assignee of the present application. U.S. Ser. No. 043,417 is incorporated hereinby reference.

The inventor has found that, below the defined range of sustained shrink force the cook-in package will tend to distort into a gourd shape if vertically hung and exposed to a cook-in cycle using heated air, and without the support of either a hot water bath, or a mold or other hydrostatic support. The inventor has also found that excessively high sustained shrink forces, will also cause a distortion of a different kind, and the package will become generally spherical.

A package made according to the invention, when vertically hung in a hot air cooking cycle, will exhibit a variation in the circumference of the package, after the cooking cycle is complete and the package has cooled to room temperature, of less than about 10% and more preferably less than about 8%; most preferably less than about 6%. This variation can be determined by measuring the circumference of the package at least two and preferably several locations in the central generally cylindrical portion 11 of the package.

Another way of describing the invention is to consider that the shrink force in the transverse direction should at least slightly exceed the hydrostatic force exerted by a contained food product at the bottom portion of the package, when the package is hung vertically, during and after a hot air cook-in cycle.

The materials of the present invention will typically have at least about 3% elastic stretch to survive the stuffing and cooking process.

Modifications will be obvious to those skilled in the art, after reviewing this description. The invention is defined by the claims which follow.

What is claimed is:

1. A package comprising a food article, and a heat shrinkable cook-in casing which encloses the food article, the casing comprising at least one layer of a thermoplastic polymer, the casing having a lay flat width of 165 millimeters or less, and having a sustained shrink force, in grams per centimeter, measured (ASTM D2838) after 15 minutes at a temperature to be used in a cooking cycle for the package, which exceeds the shrink force value obtained by the formula:

$$\frac{\text{package length (cm)} \times \text{casing lay flat width (cm)}}{3}$$

2. A package comprising a food article, and a heat shrinkable cook-in casing which encloses the food article, the casing comprising at least one layer of a thermoplastic polymer, the casing having a lay flat width of more than 165 millimeters, and having a sustained shrink force, in grams per centimeter, measured (ASTM D2838) after 15 minutes at a temperature to be used in a cooking cycle for the package, which exceeds the shrink force value obtained by the formula:

$$\frac{\text{package length (cm)} \times \text{casing lay flat width (cm)}}{3}$$

and also exceeds the shrink force obtained by the formula:

$$(5 \times \text{cooking temperature (°C.)}) - 125.$$

* * * * *